United States Patent
Philip et al.

(10) Patent No.: US 9,223,711 B2
(45) Date of Patent: Dec. 29, 2015

(54) COMBINING ASSOCIATIVITY AND CUCKOO HASHING

(71) Applicant: NETSPEED SYSTEMS, San Jose, CA (US)

(72) Inventors: Joji Philip, San Jose, CA (US); Sailesh Kumar, San Jose, CA (US); Joe Rowlands, San Jose, CA (US)

(73) Assignee: NetSpeed Systems, San Jose, CA (US)

(*) Notice: Subject to any disclaimer, the term of this patent is extended or adjusted under 35 U.S.C. 154(b) by 278 days.

(21) Appl. No.: 13/965,668

(22) Filed: Aug. 13, 2013

(65) Prior Publication Data

US 2015/0052309 A1 Feb. 19, 2015

(51) Int. Cl.
G06F 12/00 (2006.01)
G06F 12/08 (2006.01)

(52) U.S. Cl.
CPC .......... *G06F 12/0864* (2013.01); *G06F 12/082* (2013.01)

(58) Field of Classification Search
CPC ............ G06F 12/0864; G06F 12/0815; G06F 12/0891
See application file for complete search history.

(56) References Cited

U.S. PATENT DOCUMENTS

| | | |
|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 8,050,256 B1 | 11/2011 | Bao et al. |
| 8,059,551 B2 | 11/2011 | Milliken |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — John Lane
(74) *Attorney, Agent, or Firm* — Procopio, Cory, Hargreaves & Savitch LLP

(57) ABSTRACT

Addition, search, and performance of other allied activities relating to keys are performed in a hardware hash table. Further, high performance and efficient design may be provided for a hash table applicable to CPU caches and cache coherence directories. Set-associative tables and cuckoo hashing are combined for construction of a directory table of a directory based cache coherence controller. A method may allow configuration of C cuckoo ways, where C is an integer greater than or equal to 2, wherein each cuckoo way $C_i$ is a set-associative table with N sets, where each set has an associativity of A, where A is an integer greater than or equal to 2.

18 Claims, 13 Drawing Sheets

(56) References Cited

U.S. PATENT DOCUMENTS

| | | | |
|---|---|---|---|
| 8,099,757 B2 | 1/2012 | Riedl et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 8,874,842 B1* | 10/2014 | Kimmel et al. | 711/114 |
| 8,880,787 B1* | 11/2014 | Kimmel et al. | 711/103 |
| 9,020,953 B1* | 4/2015 | Zilmer et al. | 707/747 |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0097387 A1* | 4/2013 | Sanchez Martin et al. | 711/129 |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0032569 A1* | 1/2014 | Kim et al. | 707/747 |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0173379 A1* | 6/2014 | Loh et al. | 714/764 |
| 2014/0268972 A1* | 9/2014 | Bosshart | 365/49.17 |
| 2014/0372717 A1* | 12/2014 | Ciu et al. | 711/162 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W, et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

\* cited by examiner

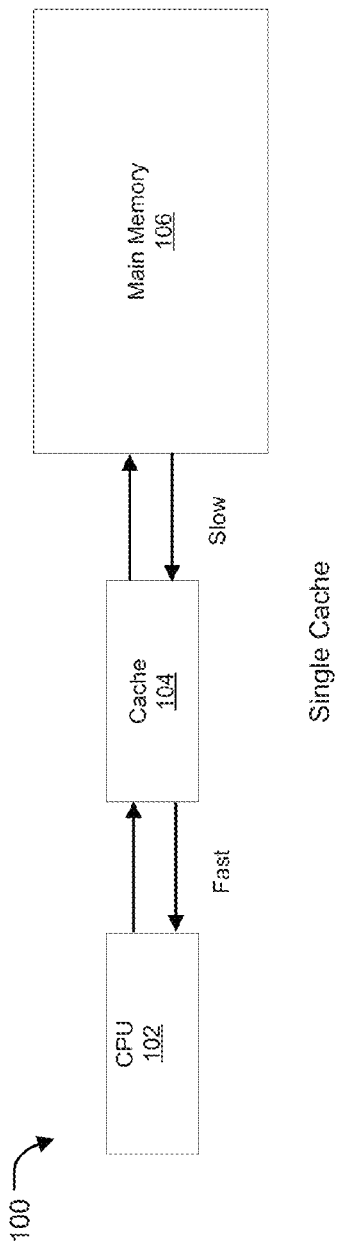
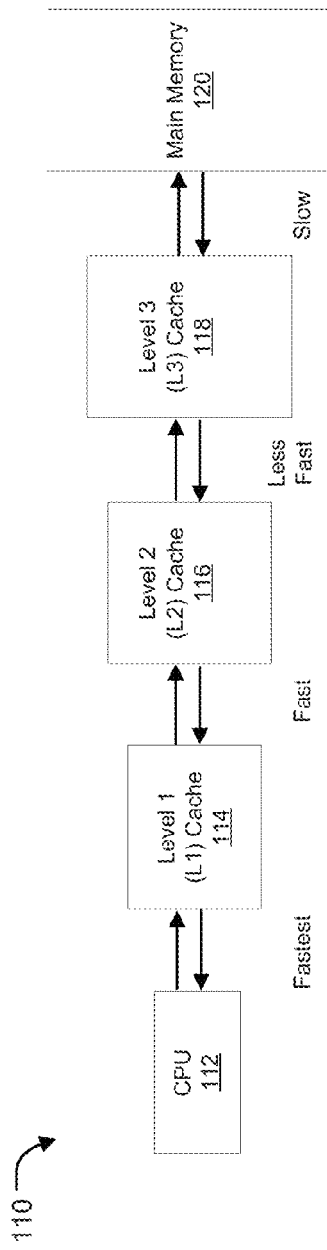

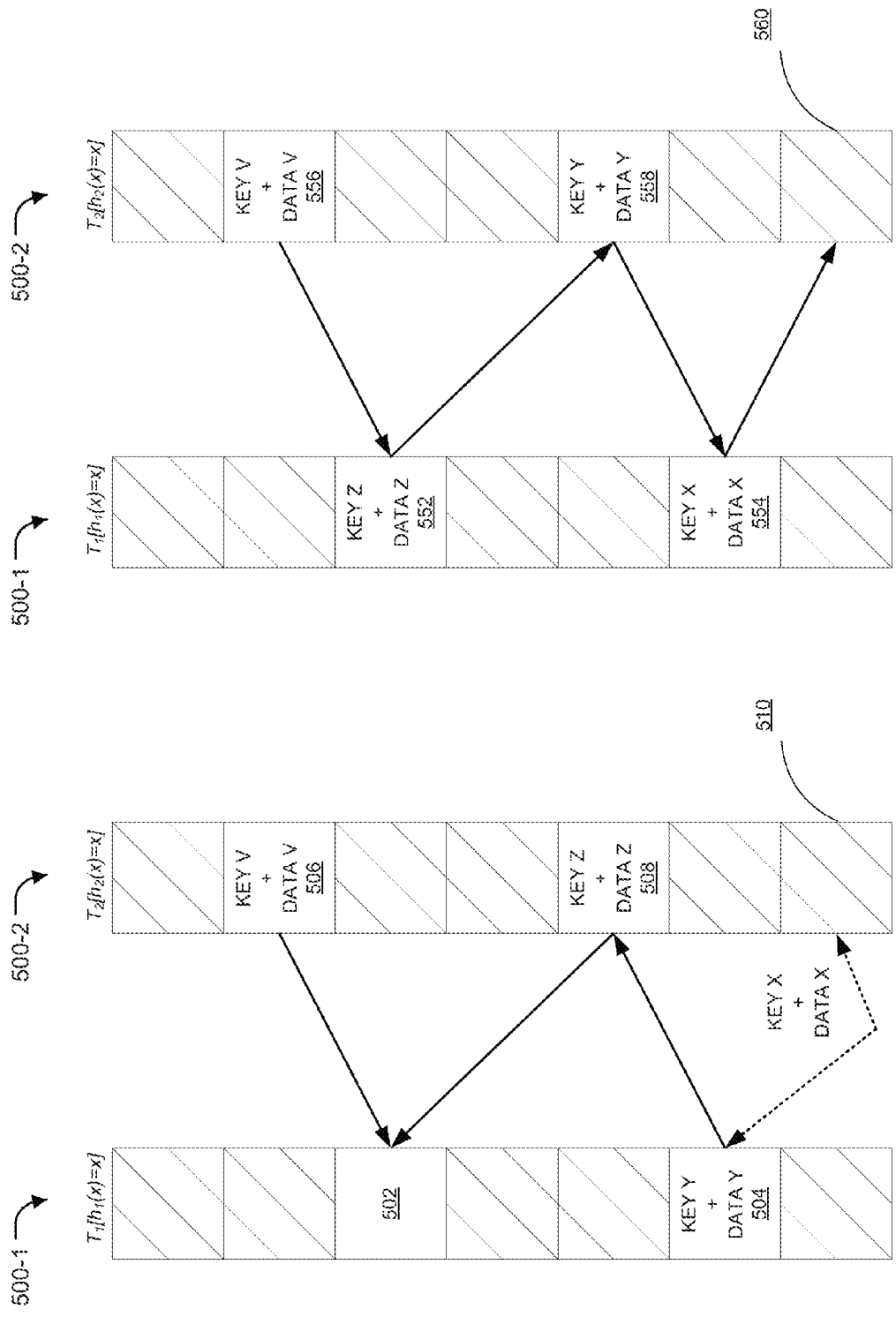

600

| Index 0, Way 0 K1 | Index 0, Way 1 |
|---|---|
| Index 1, Way 0 | Index 1, Way 1 |
| Index 2, Way 0 | Index 2, Way 1 |

Insertion of K1

FIG. 6(a)

| Index 0, Way 0 K1 | Index 0, Way 1 K2 |
|---|---|
| Index 1, Way 0 | Index 1, Way 1 |
| Index 2, Way 0 | Index 2, Way 1 |

Insertion of K2

FIG. 6(b)

| Index 0, Way 0 K3 | Index 0, Way 1 K4 |
|---|---|
| Index 1, Way 0 | Index 1, Way 1 |
| Index 2, Way 0 | Index 2, Way 1 |

Insertion of K4

FIG. 6(d)

| Index 0, Way 0 K3 | Index 0, Way 1 K2 |
|---|---|
| Index 1, Way 0 | Index 1, Way 1 |
| Index 2, Way 0 | Index 2, Way 1 |

Insertion of K3

FIG. 6(c)

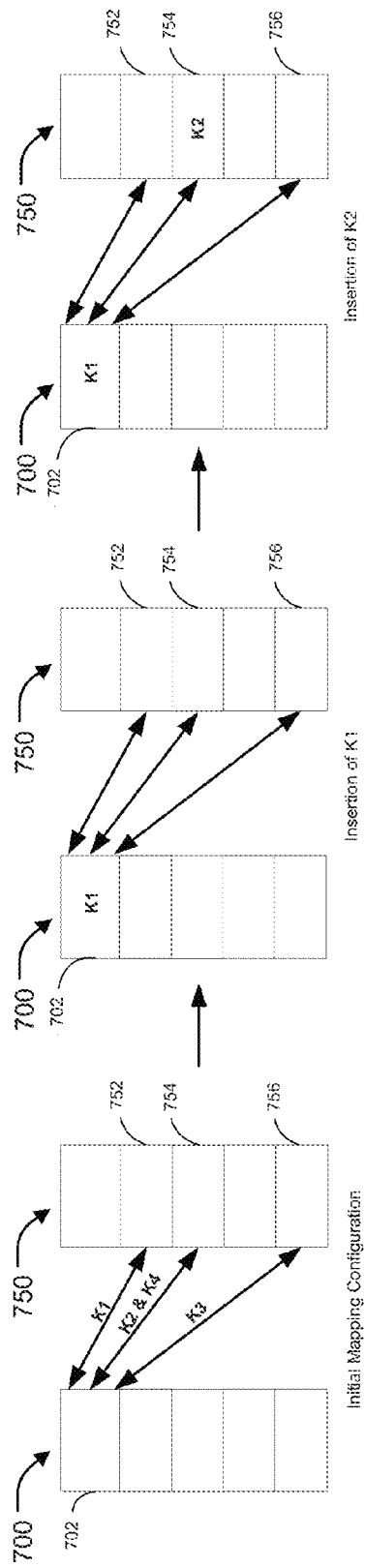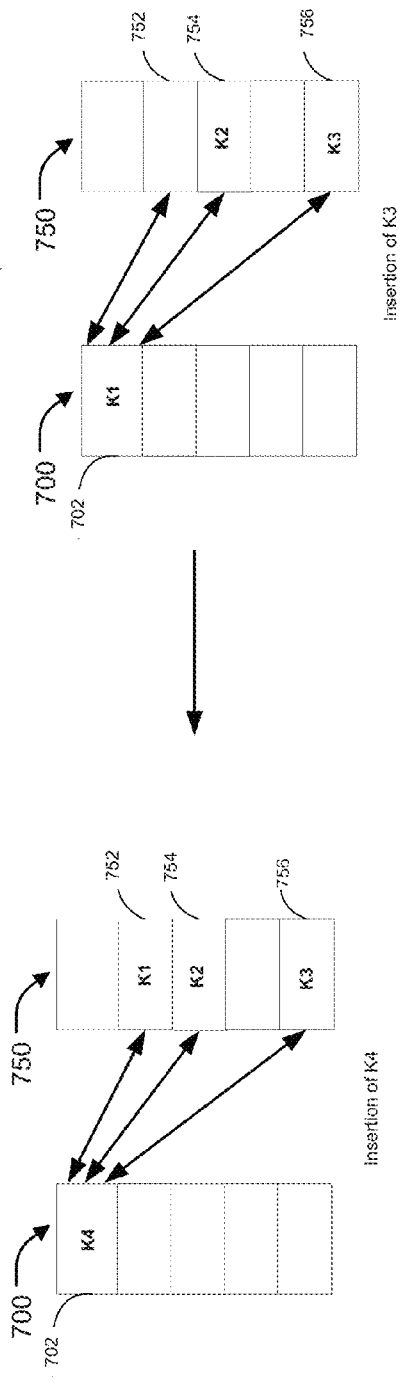

COMBINING ASSOCIATIVITY AND CUCKOO HASHING

BACKGROUND

1. Technical Field

Methods and example implementations described herein are generally directed to hardware hash tables, and more specifically, to a hash table applicable to CPU caches and cache coherence directory.

2. Related Art

In related art computer systems, instructions and data were stored and fetched from a main storage there by a memory management system for execution or use by a central processor unit, or possibly by some special function unit, such as a floating-point processor. In a few systems, some instructions and data may be retained after their use in a cache memory, which can be accessed more quickly than the main storage. As a result, such instructions and data can be reused later in the execution of the same program. This related art scheme improves the execution performance of the computer system by reducing the time taken to fetch the instructions and data for processing by the central processing unit.

In related art computer systems that have cache memories, the number of cycles required to retrieve an instruction or a data item depends on whether the data item is already in the cache or not, and on how many instructions are required to address or retrieve the data item. If the data item is not in the cache (e.g., a "cache miss"), the instruction or data item must be fetched from main memory, which consumes some number of instruction cycles. If the data item is in the cache, some instruction cycles will also be consumed, although the consumed instruction cycles will be fewer than in the case of a cache miss. Nevertheless, any improvement that can be made in the processing of cached data and instructions is useful. In certain circumstances, the improvement may make a considerable difference to the processing performance of the system.

FIG. 1(a) and FIG. 1(b) illustrate cache memory architectures 100 and 110 respectively, showing placement of cache memory in the hardware layout. As is illustrated, cache memory 104 is positioned between CPU 102 and main memory 106. Data block access from the cache 104 is much faster when compared with access of the same data block from the main memory 106. Similarly, FIG. 1(b) illustrates multiple caches 114, 116, and 118 configured between the CPU 112 and main memory 120.

Most related art caching techniques have a fundamental tradeoff between cache latency and hit rate, wherein larger caches have better hit rates but longer latency. To address this tradeoff, many computers use multiple levels of cache, with small fast caches backed up by larger, slower caches. Multi-level caches generally operate by checking the smallest level 1 (L1) cache 114 first. If a hit occurs in L1, the processor proceeds at high speed. If the smaller cache misses, the next larger cache 116 (L2) is checked, and so on to L3 caches such as 118, before external/main memory 120 is checked.

FIG. 2(a) illustrates structural layout of cache memory 200. As is illustrated, the cache memory 200 comprises multiple blocks, each having a length of K words. Each block line is also associated with a tag that identifies the block being stored. Tag is usually the upper portion of the memory address. As illustrated, the cache memory 200 comprises C blocks, which is much lesser than the number of blocks, say M, of the main memory. FIG. 2(b) illustrates architectural layout of interactions 250 between cache memory 254, processor 252, and system bus 260 through address buffer 256 and data buffer 258. As represented, processor 252 sends address level instructions to the cache to identify the location of data block that is to be fetched along with issuing data requests to the cache 254. Address information paths are provided between the CPU 252, cache 254, and address buffer 256, whereas data information paths are provided between CPU 252, cache 254, and data buffer 258. The cache 254, address buffer 256, and the data buffer 258 all interact with the system bus 260 to receive data blocks and interact with the main memory (not shown).

Typically, a cache is divided into a number of sets of lines, wherein each set comprises a fixed number of lines. A data block from main memory can be configured to map to any line in a given set determined by the respective block address. For instance, in case there are "m" number of lines in the cache, "v" number of sets, and "k" number of lines per set, the value of k would be k=m/v. In such a case, a main memory block number "j" can be placed in a set "i" based on the equation, i=j modulo v.

Improvements in cache memory performance have been sought using various methods of linking and associating groups of cache lines so as to form a policy that is configured to decide where in the cache a copy of a particular entry of main memory will go. If the policy is free to choose any entry in the cache to hold the copy, the cache is called "fully associative". At the other extreme, if each entry in main memory can go in just one place in the cache, the cache is "direct mapped". Many caches implement a compromise in which each entry in main memory can go to any one of N places in the cache, and are described as "N-way set associative". For instance, in a 2-way set associative, any particular location in main memory can be cached in either of 2 locations in a data cache. Similarly, in a 4-way set associative, any particular location in main memory can be cached in either of 4 locations in a data cache. Multiple algorithms can be used for determining the location in which the data block can be stored.

Indexing in a cache design refers to a method of storing each address in a subset of the cache structure. A common related art mechanism involves using low-order address bits to determine the entry, or the set of entries, that the data block can be stored. By restricting addresses to a very small set of entries, there is a possibility that the most useful data (usually the most recently used data) may all map to the same set of entries. Such a mapping would limit the effectiveness of the cache by utilizing only a subset of the entire structure. For indexed caches to work effectively, the addresses needed by a program at any particular time need to be spread across all of the sets of the cache. Addresses spread across the cache allow full use of the lines in the cache. Most programs naturally have a good distribution of addresses to sets, which is one reason caches work well in general.

A cache miss refers to a failed attempt to read or write a piece of data in the cache, which results in a main memory access with much longer latency. A cache read miss from an instruction cache generally causes the most delay, because the processor, or at least the thread of execution, has to wait (e.g., stall) until the instruction is fetched from main memory. A cache read miss from a data cache, on the other hand, usually causes less delay, because instructions not dependent on the cache read can be issued and continue execution until the data is returned from main memory, and the dependent instructions can resume execution. A cache write miss to a data cache generally causes the least delay, because the write can be queued and there are few limitations on the execution of subsequent instructions. The processor can continue until the queue is full.

Lowering the cache miss rate is a major area of focus. Therefore a great deal of analysis has been done on cache behavior in an attempt to find the best combination of size, associativity, block size, and so on. There can be multiple kinds of cache misses, which can impact the cache and processing performance in different ways. For instance, compulsory misses are those misses that are caused by the first reference to a location in memory. Cache size and associativity make no difference to the number of compulsory misses but prefetching data can help here, as can larger cache block sizes. Capacity misses are those misses that occur regardless of associativity or block size of the cache memory, solely due to the finite size of the cache. Conflict misses, on the other hand, are misses that could have been avoided had the cache not evicted an entry earlier. Conflict misses can be further broken down into mapping misses, that are unavoidable given a particular amount of associativity, and replacement misses, which are due to the particular victim choice of the policy (e.g., such as a replacement policy).

While the natural address distribution in programs is generally acceptable, cache performance is often limited by inadequate distribution. Some critical code sequences may concentrate activity in a particular set, which results in new lines replacing other lines that are still useful. If the program tries to access the replaced lines, the program will result in a cache miss and performance will be reduced while the processor waits for the cache to be refilled. As explained above, these caches misses are referred to as conflict misses. The cache itself may be large enough to store all of the useful lines, but the limitations due to indexing force useful lines out of the cache even though there are less useful lines elsewhere in the cache.

There are a few methods of reducing the problem of conflict misses. One way is to allow each address to go to multiple locations (set-associative). This method allows hardware to choose among several possible lines in the cache to evict. Performance can be improved by carefully selecting which line to replace, making sure the least useful address is replaced. A different approach to reducing conflict misses is to improve upon the natural distribution of addresses across sets. Using low-order bits provides a good distribution, but some patterns may exist that lead to less distribution and more conflicts. These patterns can happen because programs are written by people and compiled in a non-random manner.

To improve distribution, an index hash can be used. Hashing involves manipulating the address in such a way that any natural pattern is less likely. Hashing can be implemented by means of a hash table that uses a hash function to compute an index into an array of buckets or slots, from which the correct value can be found. As the hash functions typically introduce randomness in the placement of the data blocks based on indexes calculated such as by XOR-ing high-order bits with low-order bits, usage of hash tables is one way to "randomize" the placement of data blocks, which can lead to a more even distribution.

To make room to store additional blocks (e.g., data or instructions copied from the storage device or the memory device), each cache may have a replacement policy that enables the cache to determine when to evict (e.g., remove) particular blocks from the cache. Multiple replacement policies exist for deciding which position to load the new data block to. A random replacement policy, for instance, places the new data block in any set/block of the cache memory, but increases the probability of the miss rate, as high priority data blocks may be made to leave the cache in such a process. Other policies can include first in, first out (FIFO), which makes the oldest block exit from the cache. Least recently used (LRU) is yet another technique used for block replacement.

Shared-memory multiprocessors have been applied quite considerably in high performance computing. They continue to become more relevant in the age of large multicore systems on chip (SoC). Address space is typically shared among multiprocessors so that they can communicate with each other through that single address space. The same cache block in multiple caches would result in a system with caches because of sharing of data. This problem does not affect the read process. However, for writes when one processor writes to one location, this change has to be updated to all caches. Most cache coherency protocols have a shared state in which data can be shared between any number of system components (e.g., processors). The shared (S) state arises when a system component requests a read-only copy of the data and the data was already in an Exclusive (E) state in another system component.

The requesting system component and the system component that had a copy of the data each mark the data in shared state. When data is in the shared state, that data can be freely copied by the system components requesting a read-only copy of the data. In a system, cache coherency protocols can either permit a system component to provide the shared data to a requesting system component or the data can be retrieved from the higher memory level directly.

In directory-based cache coherency system, the cache line addresses being shared by agents in the system are tracked in a common directory that maintains the coherence information between agent caches. The directory acts as a filter through which the processor must ask permission to load an entry from the primary memory to its cache. When an entry is changed, the directory either updates or invalidates the other caches with that entry. A cache coherence protocol uses data structures and messaging to track and co-ordinate the locations of all cached copies of every block of shared data. These cache coherency maintenance data structures can be centralized or distributed and are called directories. For each block of data there is a directory entry that contains a number of pointers. The purpose of the pointers is to mention the system agent where block copies are located and, as a result, keep track of the cached copies of the data block.

When the number of sharer agents in the system is large, maintaining a bit vector for the sharers in more efficient than binary pointers for each sharing agent. Each directory entry also contains a dirty bit to specify whether a unique cache has a permission or not to write the associated block of data. In implementation, a cache miss results in communication between the node where the cache miss occurs and the directory so that the information in the affected caches is updated. A coherency protocol is a set of mechanisms to maintain coherence between the caches in the system. It defines the states of the cache lines in the system, conditions and transition between the states and operations and communications performed during coherent read and write requests. MSI is an example of a coherence protocol employed to maintain coherence in a multi-processor system. The letters M (modified), S (shared) and I (Invalid) in the protocol name identify the possible states in which a cache line can be as specified by the protocol.

Each directory entry typically contains a tag corresponding to the address of a given memory block, identifying information for locating all processors that are caching the block, and a status field indicating whether the cached copies are valid. The directory information of a node is used to evaluate read and write requests pertaining to the memory blocks of the node, and to send out coherency messages to all caches that maintain copies. When a processor in the system updates a shared memory block, the directory having jurisdiction over the memory block is consulted to determine which caches hold copies of the block. Before the write operation can proceed, invalidation messages are sent to the identified caches and invalidation acknowledgements must be returned to verify that all cached copies have been invalidated. In similar fashion, when a processor requests read access to a shared memory block, the directory having jurisdiction over the block is consulted to identify the location and status of all cached copies. Based on the information in the directory, the requested block can be provided to the requestor from one of the caches holding a valid copy, or from the main memory of the node that stores the block.

An efficient data structure is needed to implement the directory tables where coherent cache lines addresses, their sharers and states are tracked. The architecture of this table has an implication on the total amount of memory needed for tracking all the coherent cache line addresses in the system, the utilization of this memory and performance of the system.

Snooping is a process where the individual caches monitor address lines for accesses to memory locations that they have cached instead of a centralized directory-like structure doing it. When a write operation is observed to a location that a cache has a copy of, the cache controller invalidates its own copy of the snooped memory location. In the snooping solution, a snoopy bus is incorporated to send all requests for data to all processors, wherein the processors snoop to see if they have a copy and respond accordingly. This mechanism therefore involves a broadcast, since caching information is stored in the processors. A multiple snoop filter reduces the snooping traffic by maintaining a plurality of entries, each representing a cache line that may be owned by one or more nodes. When replacement of one of the entries is required, the snoop filter selects for replacement the entry representing the cache line or lines owned by the fewest nodes, as determined from a presence vector in each of the entries. A temporal or other type of algorithm is used to refine the selection if more than one cache line is owned by the fewest number of nodes.

A class of dictionary data structures called Hash tables are associative structures used to store and access [Key, Value] pairs. The defining characteristic of hash table lookup is that for the majority of accesses, a key's value is located in a linear table at an address that is determined directly by applying a function, i.e., the hash function, to the key. Because the location for storing the value is known from the key (except in those cases where there is a hash function collision), a hash table lookup can be performed on average in constant time. Hashing mechanisms play an important role in many computer systems.

One such example of a related art hashing mechanism 300 is depicted in FIG. 3. The hashing mechanism 300 comprises a key 302, a hash function 304, a hash index 306, and a hash table 308. The hash table 308 contains a number of hash buckets 310-330, and each hash bucket contains data, such as a record, with one of the fields of the record acting as the key 302. To access the hash table 308, the key 302 is input into a hash function 304, which yields an index 306 (or hash address) that refers to a specific hash bucket (e.g., 314). Within the hash bucket 314 is the data that matches the key.

Hash tables are useful because they provide direct access to data by mapping a large range of key values into a smaller range of indexes. In this manner, for example, if a key of eight digits were utilized having a range of key values from 0 to 99,999,999 and if less than ten values are ever used, a hashing mechanism can be used to hash the key into an index of one digit to refer to a hash table containing ten buckets. Therefore, instead of using a hash table having one-hundred-million hash buckets where only a very limited number of the buckets are ever used, a hash table of only ten buckets can be used to more efficiently use system resources, but still provide direct access to the data. The function "h" 304 maps each key value onto exactly one index, and therefore, whenever the same key value is used more than once, the same index 306 into the hash table 308 is generated. Sometimes, however, when attempting to store data in the hash table 308, more than one key value will hash to the same index 306. In this situation, a "collision" has occurred.

When a collision occurs, the data must be stored in the hash bucket indicated by the index and therefore more than one record will be stored in this hash bucket. Hash bucket 318 depicts the state of a hash bucket after a collision has occurred and more than one record is stored in the hash bucket. In hash bucket 318, one record of data "Data 3" is linked to a second record of data "Data 4." As more collisions occur, the hash buckets become more populated and thus the benefits of a hash table start to diminish because each record within the hash bucket is no longer directly accessible. Instead, after hashing the key value into an index, the index refers to a hash bucket that contains a number of records linked together and the hash bucket must then be searched to determine the correct record, which is costly in terms of processing time. Therefore, related art hashing systems are designed to avoid collisions.

Any hash set algorithm must deal with collisions. Collisions are when two distinct items hash to the same table entry. Open addressing algorithms typically resolve collisions by applying alternative hash functions to test alternative table elements. Closed addressing algorithms place colliding items in the same bucket, until that bucket becomes too full. In both types of algorithms, it is sometimes necessary to resize the table. In open addressing algorithms, the table may become too full to find alternative table entries, and in closed addressing algorithms, buckets may become too large to search efficiently. Open addressing schemes have the potential performance advantage of involving one level less of indirection in accessing an item in the table, since the item is placed directly in an array, not in a linked list implementing a bucket.

One important statistic for a hash table is called the load factor, which is simply the number of entries divided by the number of buckets, that is, $\alpha=n/k$, where $\alpha$ is the load factor, n is the number of entries, and k is the number of buckets. If the load factor $\alpha$ is kept reasonable, the hash table should perform well, provided the hashing is good. If the load factor $\alpha$ grows too large, the hash table will become slow, or it may fail to work (depending on the method used). For a fixed number of buckets, the time for a lookup grows with the number of entries and so does not achieve the desired constant time. If the set implementation used for the buckets has linear performance, then $O(1+\alpha)$ time may be required to do add, remove, and member. To make hash tables work well, it is necessary to ensure that the load factor $\alpha$ does not exceed some constant $\alpha_{max}$, so all operations are $O(1)$ on average.

Cuckoo hashing is a related art multiple-choice hashing scheme that gives better space utilization by moving elements around as needed. This technique was originally presented by Pagh and Rodler in Cuckoo Hashing, *Proceedings of the 9th European Symposium on Algorithms* (2001). Cuckoo hashing employs two hash functions and two respective hash tables ($T_1$ and $T_2$), which may be considered to be two portions or subtables of a single cuckoo hash table. Each entry is stored in a bucket of $T_1$ or a bucket of $T_2$, but never in both.

FIG. 4 is a diagram of cuckoo hash tables arranged according to related art principles. Here, the table $T_1$ is identified by reference number 400 and the table $T_2$ is identified by reference number 450. As explained, a given key will be hashed by the first hash function to determine its bucket in table $T_1$ and that same key will be hashed by the second hash function to determine its bucket in table $T_2$. In other words, using the same nomenclature, $T_1[h_1(x)]=x$ and $T_2[h_2(x)]=x$, where $h_1$ is the first hash function, $h_2$ is the second hash function, and x is the key.

In practice, therefore, a given key is hashed using the two different hash functions to obtain two possible cuckoo hash table locations or buckets (alternatively, a single hash function with multiple results can be used). Then, those buckets can be searched for the key. If the key is found in one of the two buckets, then data stored with that key can be accessed, retrieved, processed, etc. As an example, FIG. 4 illustrates that Key A can be potentially stored in its respective bucket 402 in table 400 or in its respective bucket 458 in table 450. The arrow between bucket 402 and bucket 458 indicates potential movement or pushing of Key A between bucket 402 and bucket 458. As depicted in FIG. 4, Key B has its potential locations in table 400 and table 450, Key C has its potential locations in table 400 and table 450, and Key D has its potential locations in table 400 and table 450. In practice, table 400 and/or table 450 can include a number of empty buckets such as 406 to accommodate the insertion of new keys (and corresponding data) and to accommodate pushing of existing keys between table 400 and table 450.

A hash function may generate the same hash value (i.e., a locator or identifier for a given bucket) for two or more different input values. In other words, given a first key $x_1$ and a second key $x_2$, $h_1(x_1)$ might equal $h_1(x_2)$. In a cuckoo hash table, collisions are handled by moving entries from one table to another. With this in mind, FIG. 5(a) and FIG. 5(b) are diagrams (used for purposes of this simplified example) that illustrate pushing of keys in cuckoo hash tables. FIG. 5(a) depicts the status of the first table 500-1 and the second table 500-2 at a time when an entry (Entry X, which includes Key X and corresponding data) is to be inserted. The shaded areas represent occupied or unavailable buckets in the table. As explained above, the two hash functions indicate that Entry X can be inserted into the bucket 504 of table 500-1 or into the bucket 510 of table 500-2 (but not both). This example represents an attempt to initially insert Entry X into bucket 504. The arrows in FIG. 5(a) and FIG. 5(b) indicate the manner in which the given entry can be pushed from table 500-1 to table 500-2, or vice versa. Thus, referring to FIG. 5(a), although Entry Y is contained in bucket 504, it may alternatively be contained in the bucket 508 of table 500-2. Similarly, although Entry Z is presently contained in bucket 508, it may be pushed into the bucket 502 of table 500-1. It is to be noted that bucket 508 may contain either Entry Y or Entry Z, meaning that the hash function $h_2(x)$ will generate the same value (corresponding to bucket 508) using either Entry Y or Entry Z as an input value. Moreover, Entry V can be moved from its current location (the bucket 506 of table 500-2) to its alternative location, namely, bucket 502 of table 500-1.

FIG. 5(b) depicts the status of the first table 500-1 and the second table 500-2 after insertion of Entry X and pushing of Entry Y and Entry Z. As shown, Entry X is now contained in bucket 554. Entry X displaced Entry Y, which has been pushed to bucket 558. In turn, Entry Y displaced Entry Z, which has been pushed to bucket 552. The insertion of Entry X was possible because bucket 552 of table 500-1 was empty prior to the insertion operation (see FIG. 5(a)). If the cuckoo hash tables are appropriately sized and managed, then enough empty buckets can be maintained to ensure that insertion and other operations do not fail.

Extensions of cuckoo hashing are also known to have more than two hash functions and therefore more than two hash tables. Although having multiple cuckoo ways would be efficient and lessen the chances of a cache miss, a higher number of cuckoo ways would require an equal number of hash functions to generate the random indices for the cuckoo ways. Hardware implementation of these hash functions won't be trivial in terms of complexity, area, power and timing costs. Therefore, it is desirable to have a hardware hash table that enhances the efficiency of conflict miss performance, resulting in a higher processing capability.

SUMMARY

The present application is directed to addition, search, and performance of other allied activities relating to keys in a hardware hash table. The present application is further directed to high performance and efficient design of hash table applicable to CPU caches and cache coherence directories. Aspects of the present invention include combining set-associative tables and cuckoo hashing for construction of a directory table of a directory based cache coherence controller.

Aspects of the present invention may include a method that allows configuration of C cuckoo ways, where C is an integer greater than or equal to 2, wherein each cuckoo way $C_i$ is a set-associative table with N sets, where each set has an associativity of A, where A is an integer greater than or equal to 2. In other words, each cuckoo way $C_i$ includes A associative ways. Contents of each set-associative table include the key/tag and an associated value. It would be appreciated that C cuckoo ways would require C number of hash tables and, at the same time, associativity of A would require at least A locations for each data block to be stored in. In one example implementation, the number of associative ways in each cuckoo way can be different.

Aspects of the present disclosure may include a method for searching a key in multi-way cuckoo hash tables, wherein each hash table has a multi-way associative table. For instance, the method and system thereof can include a 2-way cuckoo hash table, wherein each hash table has a 2 way set associative table. In such an example implementation, each key can be processed by corresponding hash function of each of the two hash tables and then the two indices generated after processing point to one 2 way sets in each of the two cuckoo hash tables. These two sets are searched to identify whether the key value is present in any of the 2 locations corresponding to the index in each hash table. Similarly, in a 2-way cuckoo having a 4-way set associative table, a key value can be searched for in a total of 8 locations (4 of each hash table as a value can be stored in 4 possible locations of 4-way set associative table).

Aspects of the present application may include a computer readable storage medium storing instructions for executing a process. The instructions may involve configuration of C cuckoo ways, where C is an integer greater than or equal to 2, wherein each cuckoo way $C_i$ is a set-associative table with N sets, and where each set has an associativity of A, where A is an integer greater than or equal to 2.

BRIEF DESCRIPTION OF THE DRAWINGS

FIG. 1(a) and FIG. 1(b) illustrate example cache memory architectures respectively showing placement of cache memory in the hardware layout.

FIG. 5(a) and FIG. 5(b) illustrate pushing of keys in cuckoo hash tables.

FIGS. 6(a) to FIG. 6(d) illustrate example pushing of keys in a set associative table.

FIGS. 7(a) to FIG. 7(e) illustrate example pushing of keys in cuckoo hash tables.

DETAILED DESCRIPTION

Figure 2A:
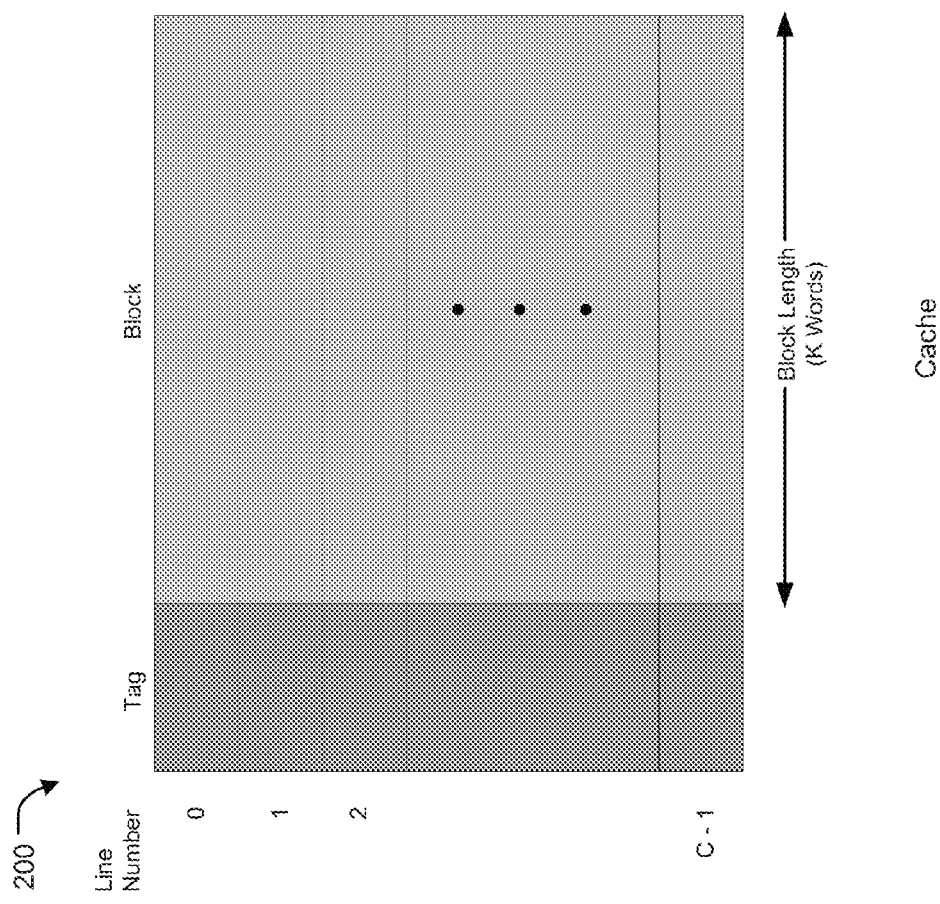
FIG. 2(a) illustrates structural layout of cache memory.
Figure 2B:
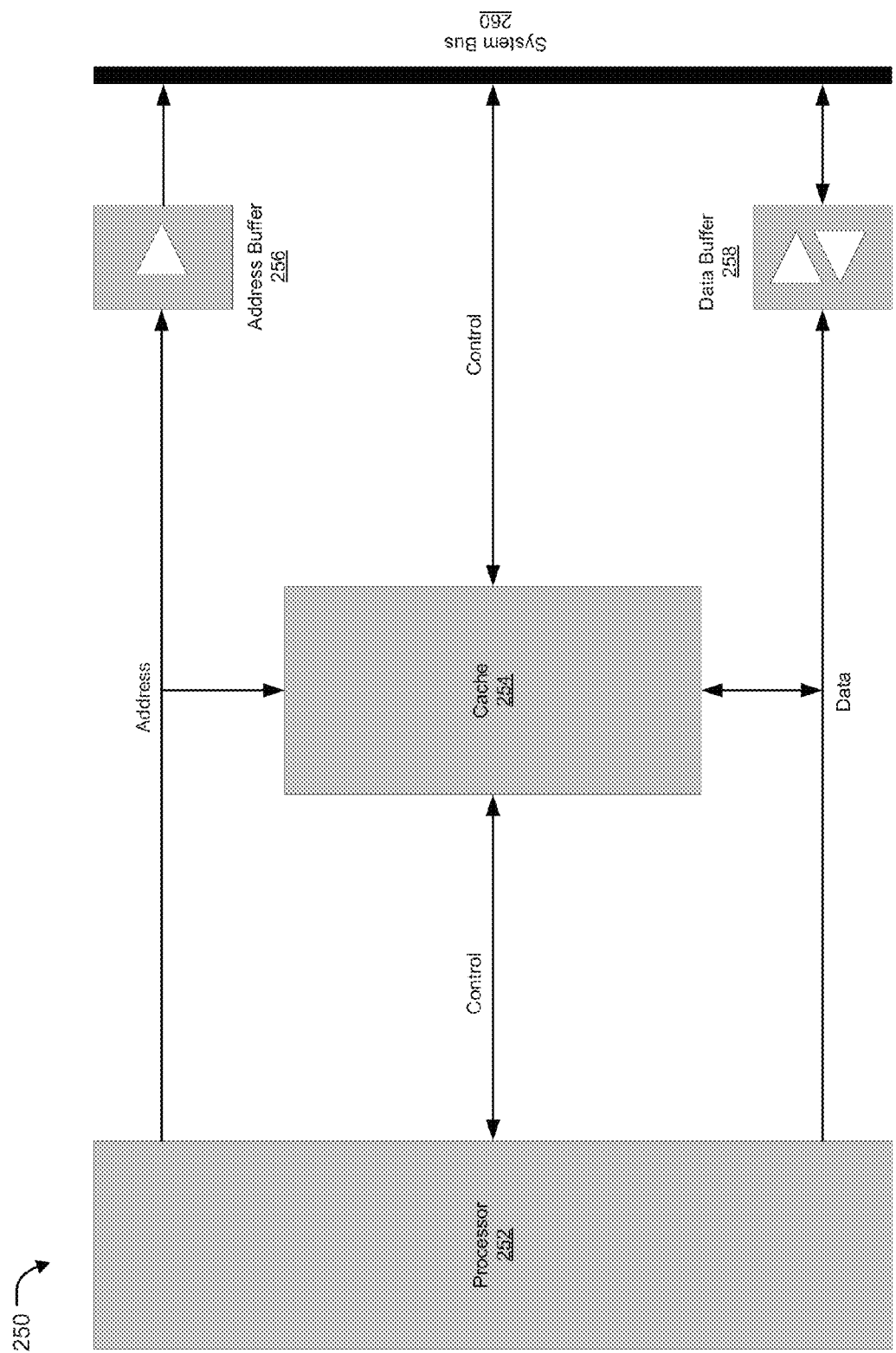
FIG. 2(b) illustrates interactions between processor and cache through address and data lines.
Figure 3:
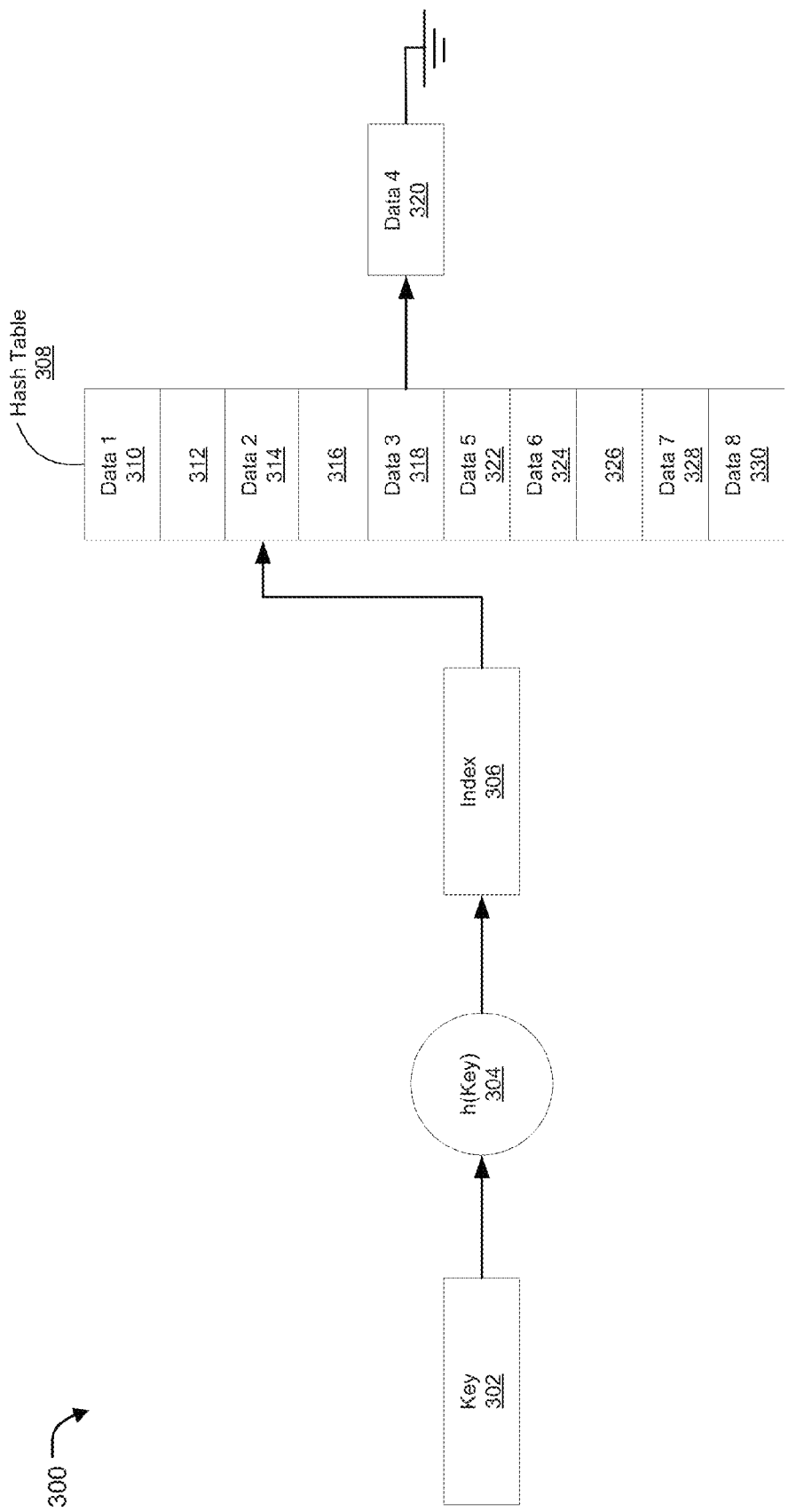
FIG. 3 illustrates an exemplary hashing mechanism.
Figure 4:
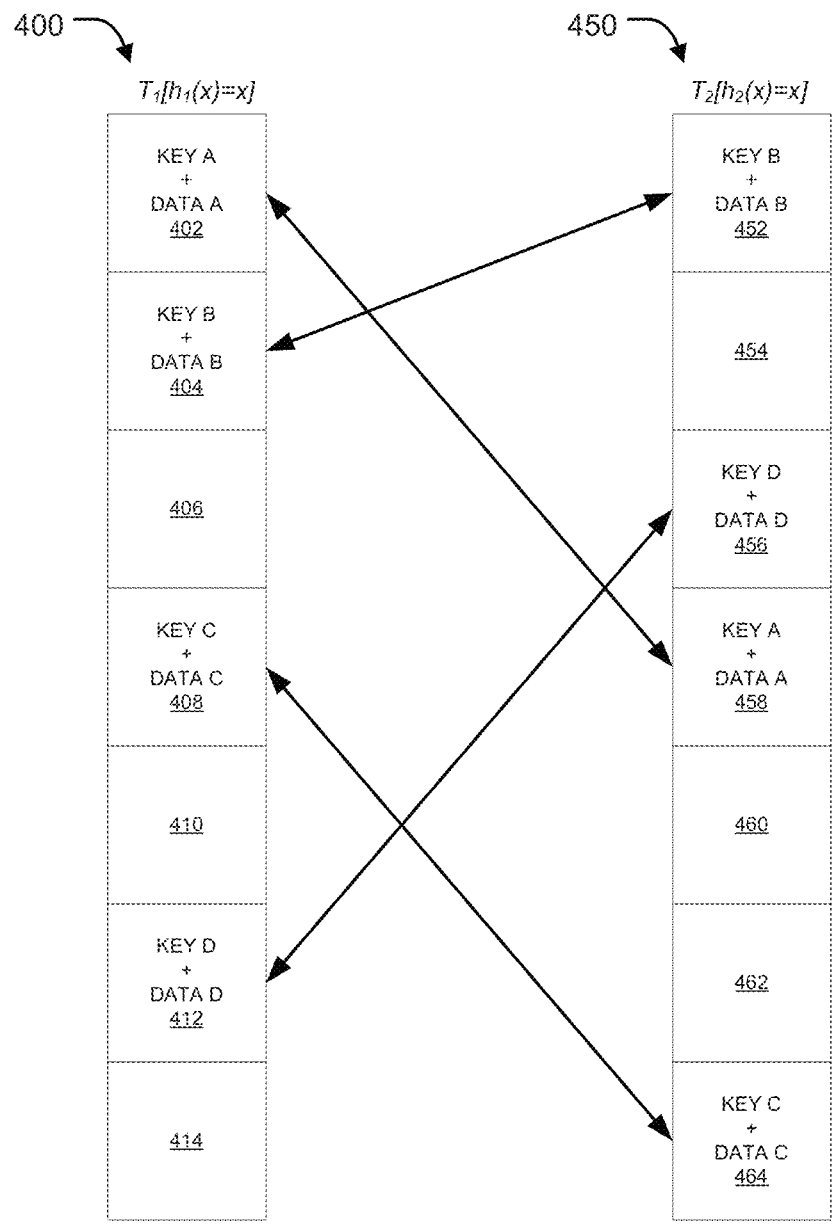
FIG. 4 illustrates example cuckoo hash tables and mapping of keys between hash tables.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The proposed subject matter discloses a hardware hash table that implements a combination of associativity and cuckoo hashing. The disclosed hash table can be applied to but is not limited to CPU caches, directories for cache coherence, among other like structures. An example implementation of the disclosure as it applies to a directory based coherence controller will also be described, without in any way restricting the general applicability of the presented disclosure.

FIGS. 6(a)-(d) and FIG. 7(a)-(e) illustrate a comparison between a simple set associative table with a cuckoo hash table. Considering a 2-way set associative table and hash tables configured to implement two cuckoo ways, it is assumed that both tables have the same total capacity and a load factor of 50%. Consider four keys K1, K2, K3, and K4 added to the tables in that sequence. As illustrated in FIG. 6, through sequence of FIGS. 6(a) to 6(b), it is assumed that the keys map to the same associative set of the set-associative table (say Index 0), K1 and K2 get added to the table in the way 0 and way 1 of index 0 respectively, as can be seen in FIG. 6(a) and FIG. 6(b). When K3 is added as shown in FIG. 6(c), there will be a conflict miss, causing K1 or K2 to be evicted out of the table. FIG. 6(c) shows the eviction of K1 from Index 0, Way 0. Insertion of Key K4 will cause yet another eviction, which has been shown in FIG. 6(d) through the eviction of K2 from Index 0, Way 1.

Considering the same scenario for the cuckoo table through FIG. 7, it is assumed that hash function H1, through hash table 700 gives the four keys (K1-K4) the same index in cuckoo way 0, for instance index 1 at 702 but hash function H2, through hash table 750, gives different indices to K1, K2, K3, K4 in the second cuckoo way, at locations 752, 754, 756, and 754 respectively. FIG. 7(a) shows the initial mapping configuration of different keys, wherein as mentioned above, for hash table 700, index 0 corresponding to block 702 maps to all the keys K1-K4 and for hash table 750, K1 is indexed to 752, K2 and K4 are indexed to 754, and K3 is indexed to 756. When K1 is added, it takes up its index in cuckoo way 0 at 702 in hash table 700, as illustrated in FIG. 7(b). At FIG. 7(c), when K2 is added, its index in cuckoo way 0 is already occupied by K1, and therefore K2 gets added to cuckoo way 1, which is in table 750 at location 754. Similarly, at FIG. 7(d), when K3 is added, it conflicts with K1 in cuckoo way 0 and therefore takes up its empty position in cuckoo way 1 in table 750 at location 756. Hence all three keys could be added to the table without any evictions.

Assuming Key K4's indices conflict with K1 in cuckoo way 0 at location 702 and with K2 in cuckoo way 1 at location 754. This causes K1 to be removed to make way for K4 as can be seen at FIG. 7(e), at which time, K1 in turn gets moved to its empty index position in cuckoo way 1 in table 750 at location 752. As described in the example, in a lightly loaded table, there is a high probability that a key will have its alternate cuckoo index unoccupied. This allows it to be moved to its alternate location to make way for a new conflicting key. This ability to move keys to alternate locations allows cuckoo tables to have lower conflict misses compared to simple set-associative tables. The reduced conflict miss evictions may also lead to better memory utilization for the cuckoo tables.

In line with the above example, compared to an 8-way set associative table, a cuckoo table with 8 cuckoo ways may offer substantially lower conflict misses and improved utilization. However, having 8 cuckoo ways would require 8 hash functions to generate the random indices for the 8 cuckoo ways. Hardware implementation of these hash functions and the logic required to select and move entries among the 8 ways is not trivial in terms of complexity, area, power and timing costs. The present example implementation therefore discloses an alternate configuration having a cuckoo table with two ways, wherein each cuckoo way is a 4-way set associative table. Such a configuration strikes a balance between the pure 8-way set-associative and pure 8-way cuckoo configurations, wherein hardware complexity in such a configuration may be significantly lesser compared to the cuckoo only configuration. Conflict miss performance may also be significantly better than the pure set associative configuration. In such a proposed configuration, when compared with an 8-way pure cuckoo configuration, the amount of random index choices available to move conflict entries around is limited because there are only two cuckoo ways, but the set associativity within each cuckoo way still allows the conflict to be handled in the associative ways within the cuckoo way.

Further, set associativity allows an eviction policy such as LRU to be implemented among the entries in the same associative set. This can allow eviction of less favorable entries in the event of conflict misses. Such selective eviction improves the overall system performance. In contrast, an LRU will be much more difficult to implement among the 8 random indices across the 8 ways of a pure cuckoo table. Hence, an eviction policy may not be as effective in a pure cuckoo table, which in the proposed architecture would be highly efficient.

According to one example implementation, a hash table, as proposed in the disclosure, can comprise C cuckoo ways, where C is an integer greater than or equal to 2. Each cuckoo way $C_i$ is a set-associative table with N sets, where each set has an associativity of A, where A is an integer greater than or equal to 2. In other words, each cuckoo way $C_i$ comprises of A associative ways. Contents of an associative way consist of the key and associated value. It would be appreciated that C cuckoo ways would require C number of hash tables and, at the same time, associativity of A would require at least A locations for each data block to be stored in.

For a case where C==1 and A>=2, the table reduced to the well-known set associative table. Similarly, for A==1 and C>=2, the table reduces to the basic multiple choice hashing table Cuckoo hashing. Further, for C==1 and A==1, the table becomes a direct-mapped table. Each key that can be added into the table has a single fixed set index in each of the C cuckoo ways. These indices are obtained by performing a set of hash functions H (H==C) on the key, where hash function $H_i$ defines the set index for the key in cuckoo way $C_i$. A new key can be added to any one of its target sets in the cuckoo ways based on a defined policy. Further, within the indexed set of the selected cuckoo way, an associative way can be picked based on another defined policy.

Associative set of each cuckoo way into which a new entry can be added can be selected based on multiple criteria, wherein the first criterion, for instance, can be to pick a set that has an empty associative way. If all the indexed associative sets have empty locations, it may be preferable to pick a set that has the maximum number of empty associative ways. If all the choices of associative sets have the same number of empty associative ways, one may optionally choose the cuckoo way with the lightest overall load. This spreads out the use of line and reduces the potential for new request to find no empty position. It would be appreciated that any other algorithm can also be implemented while choosing the associative set into which a new entry is to be added, and each such algorithm is completely within the scope of the present disclosure.

In one example implementation, finding a key can involve first performing the set of H hash operations to obtain C indices. These indices are then used to address into each cuckoo way. The key is then associatively searched in the addressed set of each cuckoo way. If present, the key is expected to be found in a single associative way of a single cuckoo way. Searching the table for a key is a constant time operation represented by the standard notation O(1).

In another example implementation, when an entry is added to the table, if all associative ways of its indexed associative sets in all the cuckoo ways are occupied by other entries, then a conflict miss has occurred. Based on an eviction policy, one of the existing entries is evicted and replaced by the new entry. The evicted entry computes the hash functions to obtain its indices into all the cuckoo ways. If a free location is available in any one of its associative sets, it gets inserted there; else it evicts and replaces one of the existing entries. The newly evicted entry in turn performs the same set of operations. This reshuffling continues till an evicted entry finds a vacant location in the table to get added without an additional accompanying eviction.

Figure 8:
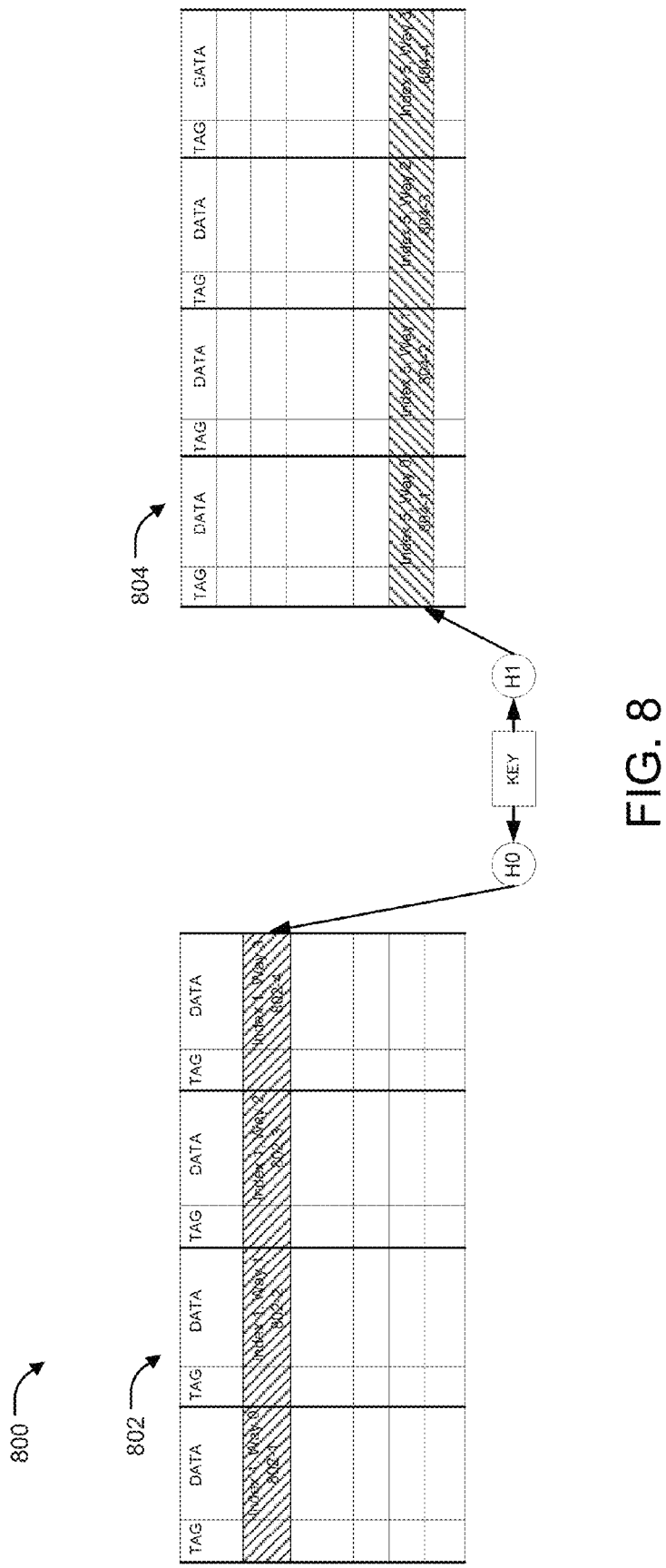
FIG. 8 illustrates an exemplary combination of cuckoo hash tables with a 4-way set associative table.

FIG. 8 illustrates an exemplary combination 800 of cuckoo hash tables with a 4-way set associative table. As illustrated, 2 cuckoo ways 802 and 804 have been implemented with each cuckoo hash table comprising a 4-way set associative table. In an instance, the shaded portion of hash table 802 represents four possible locations where a new entry having the same index can be positioned. The shaded portion, for instance, can represent, way 1, way 2, way 3, and way 4 of index 1. Likewise 4 ways for each index can be included in the cuckoo hash table 802. Similar structure can also be adopted for tables 804. As illustrated further, hash function H0 and H1 correspond to the two hash tables 802 and 804 respectively.

A key as illustrated in FIG. 8 can be processed by each hash function H0 and H1 and accordingly placed at any appropriate index in the respective hash tables. For instance, hash function H0 can place the key in any of the locations 802-1 to 802-4 and hash function H1 can place the key in any of the locations 804-1 to 804-4. In case, during placement of the key, locations 802-1 to 802-4 are filled, the key can be entered in any of the empty locations of blocks 804-1 to 804-4. In an example implementation, hash tables can also be prioritized or parameterized such that lookup for availability of space can first be done in hash table 804 and then in table 802.

It should be appreciated that multiple way cuckoo can be configured such that each hash table has a different set associativity. For instance, a 2 way cuckoo can be implemented such that the first hash table has a 4-way set associative table and the second hash table has a 2-way set associative table. Any other combination of number of cuckoo ways and number of set associative ways within each cuckoo can be implemented in an aspect of the present disclosure.

A conflict miss typically requires an existing entry to be temporarily moved out of the table to make space for the new incoming entry. This removed entry will attempt re-insertion based on the cuckoo scheme but might eventually have to be fully evicted if the cuckoo operation fails to find an alternate spot for it. Hence, an unsuitable choice of an entry for eviction may affect system performance. Since an LRU policy is difficult to implement across the cuckoo ways, choice of the cuckoo way for eviction can be based on picking the cuckoo way with the largest load. Within the associative set of the cuckoo way selected for eviction, an LRU scheme can be used to evict the most optimal entry.

Although cuckoo hashing on an average provides constant insertion time, there is a finite probability of some insertions taking a large number of moves. In such a scenario, cuckoo hashing proposes complete rehashing of the whole data structure using different hash functions. Large numbers of moves during an insertion or rehashing of the entire table are both impractical for most hardware applications. In an example implementation, the proposed hardware hash table limits the maximum number of moves to a finite number, wherein if re-insertion doesn't complete within a given (predefined or dynamically decided) number of moves, the key is fully evicted or discarded from the table. In one example implementation, the number of moves is limited to one. In this case, an evicted key attempts re-insertion at its associative sets in the cuckoo ways other than the one from which it was evicted. If none of these associative sets has an empty location to accommodate the key, it is removed from the table.

Figure 9:
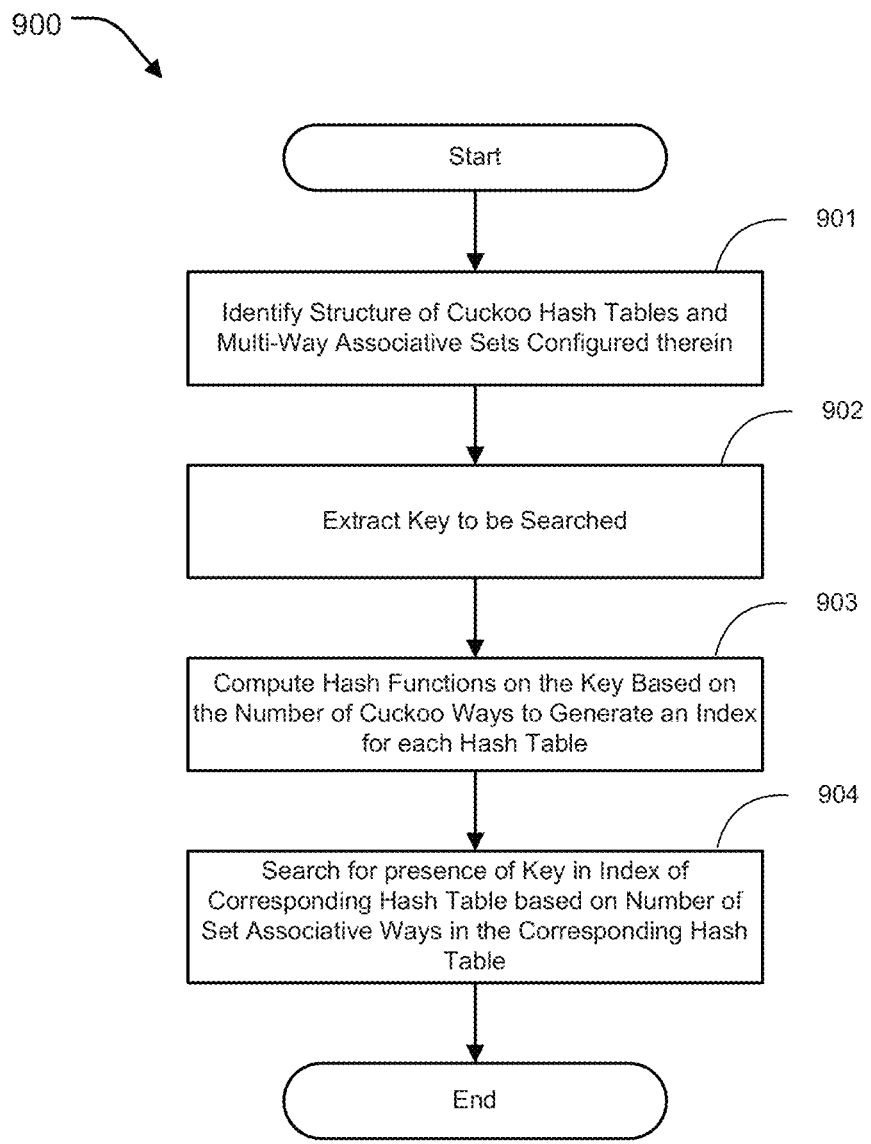
FIG. 9 illustrates a flow diagram for conducting search for a key in a multi-way cuckoo having multi-way associative sets.

FIG. 9 illustrates a flow diagram 900 for conducting search for a key in a multi-way cuckoo having multi-way associative sets. At 901, structure of the hash table can be identified to evaluate the number of cuckoo ways C and the number of associative ways A in each cuckoo way. As each cuckoo way can include different associative set ways A, such identification is important to effectively search for a key in the hash tables. At 902, the key to be searched for in the hash tables is extracted. At 903, based on the number of cuckoo ways, hash functions of each respective way process the keys to identify corresponding indices for each hash table. This operation can either be performed simultaneously for each cuckoo way or can be done sequentially. For instance, in case the hardware hash table comprises C number of cuckoo ways, the key K can be processed by C hash functions corresponding to C hash tables to generate C indices. At 904, based on the number of associative ways in each of the C hash tables, the associative sets (addressed by the generated indices from 903) in each of the cuckoo ways are searched for confirmation of whether the key is present in any of the associative ways.

The search can be performed in parallel across all the associative ways of the indexed associative sets of all the cuckoo ways or such search can be performed in any possible sequential manner.

Figure 10:
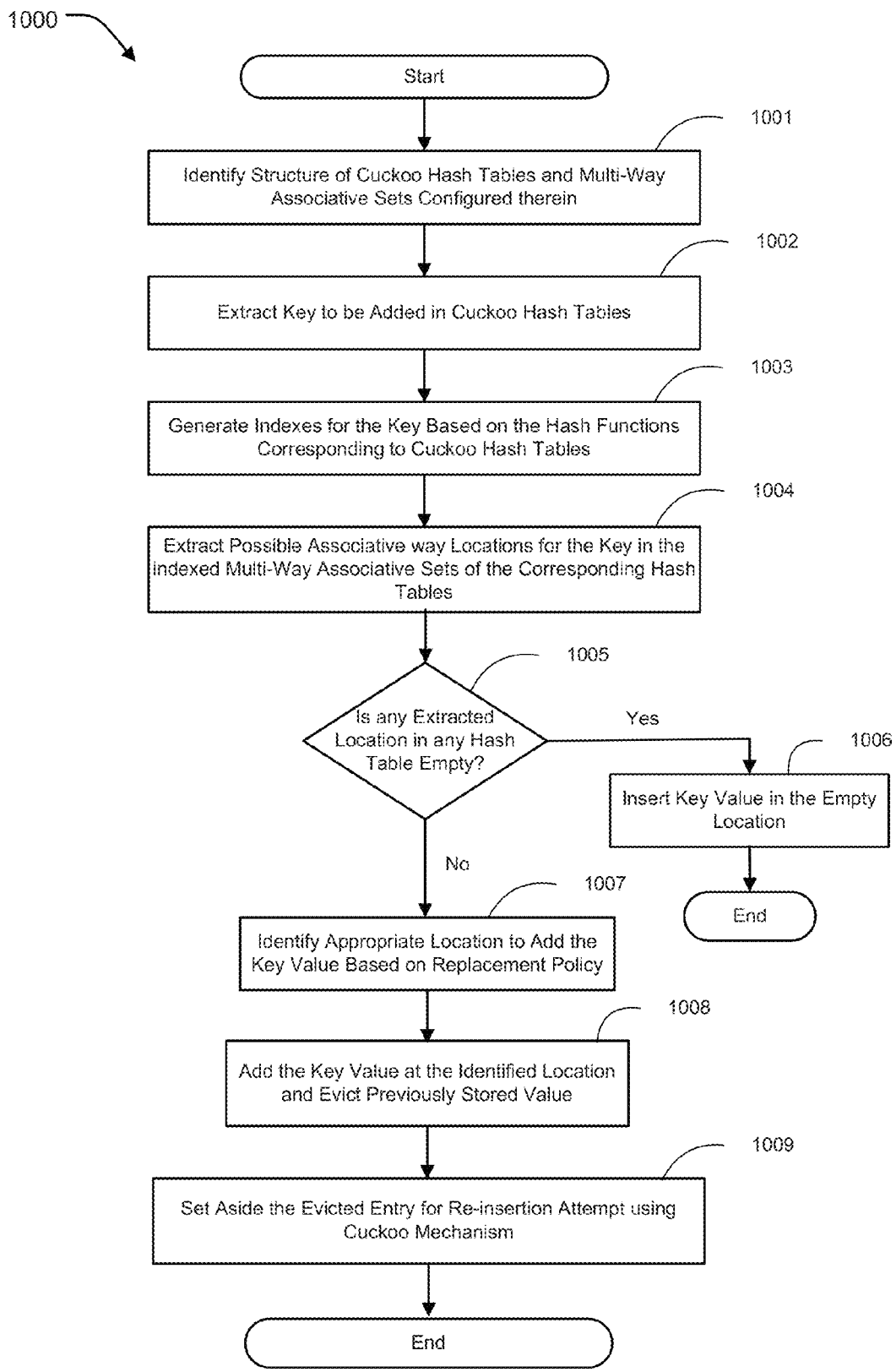
FIG. 10 illustrates a flow diagram for addition of a key in a multi-way cuckoo having multi-way associative sets.

FIG. 10 illustrates a flow diagram 1000 for addition of a key in a multi-way cuckoo having multi-way associative sets. At 1001, structure of the hash table can be identified to evaluate the number of cuckoo ways C and the number of associative ways A in each cuckoo way. As each cuckoo way can include different associative set ways A, such identification may be important to effectively search for a key in the hash tables. At 1002, the key to be added in the hash tables is extracted. At 1003, hash function of each cuckoo way is configured to process the key to be added to generate an index. This operation can either be performed simultaneously for each cuckoo way or can be done sequentially. At 1004, possible locations for the key in the indexed multi-way associative set of each cuckoo way are extracted. At 1005, for each hash table, it is checked as to whether an empty location is present in any of extracted locations of the corresponding multi-way associative set. This operation can either be performed in one hash table and its corresponding multi-way associative set at a time or can be conducted in parallel for multiple hash tables. At 1006, if an empty location is identified, the key (and value corresponding thereto) is inserted into the empty location. At 1007, in case no empty location is identified, an appropriate location for addition of the key is determined from the extracted locations based on one or more replacement policies. At 1008, the key is added in the determined location and the previously stored value in the determined location is evicted. At 1009, the evicted entry is set aside for re-insertion attempt into the table using cuckoo mechanism.

In one example implementation, the proposed hash table may further include a fully associative victim cache for temporarily holding entries evicted from any set associative way of any cuckoo way. This victim cache may be used as part of a mechanism handling the cuckoo operation. A victim cache is typically a small, fully associative cache that provides some extra cache lines for data removed from the set-associative or other types of caches due to misses. Entries in the victim cache, which were originally evicted from one of the cuckoo ways attempt to get re-inserted at their target indices in the other cuckoo ways. The victim cache therefore acts as an extension of the hash table, wherein, in an example implementation, an incoming key is searched associatively in the victim cache in addition to the main hash table. In an example implementation, a hardware process may perform the cuckoo hashing operation by periodically taking entries from the victim cache and re-inserting these entries into one of the cuckoo ways other than the one from which it was evicted.

In another example implementation, with a single move attempt, an entry from the victim cache cannot be re-inserted into the other cuckoo ways if they are all fully occupied. In this case, the entry may be discarded from the table. Other mechanisms for implementing the cuckoo operation can be conceived within the scope of the proposed hash table concept.

Figure 11:
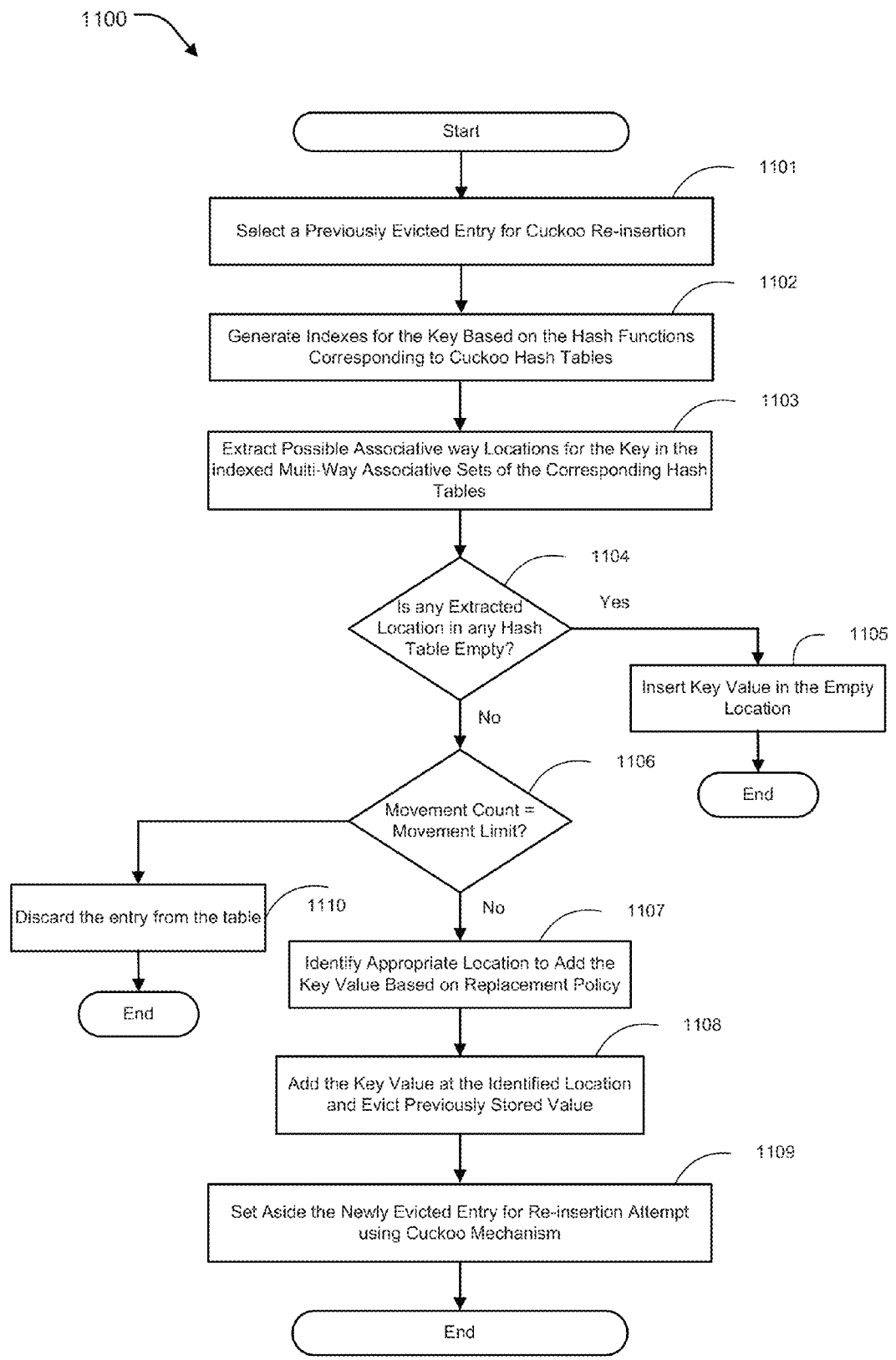
FIG. 11 illustrates a flow diagram for re-insertion of entries evicted from the table during addition of new entries.

FIG. 11 illustrates a flow diagram 1100 for re-insertion of entries evicted from the table during the addition of a new entry as described in FIG. 10. The re-insertion process uses cuckoo hashing's moving mechanism. In 1101, an entry is selected from the structure holding previously evicted keys. In 1102, hash function of each cuckoo way is configured to process the key to be re-inserted to generate an index. This operation can either be performed simultaneously for each cuckoo way or can be done sequentially. At 1103, possible locations for the re-insertion key in the indexed multi-way associative set of each cuckoo way are extracted. At 1104, for each hash table, a check is performed as to whether an empty location is present in any of extracted locations of the corresponding multi-way associative set. This operation can either be performed in one hash table and its corresponding multi-way associative set at a time or can be conducted in parallel for multiple hash tables. At 1105, if an empty location is identified, the re-insertion key (and value corresponding thereto) is inserted into the empty location. At 1106, in case no empty location is identified, a check for a configured or parameterized number of movements is made.

Movement limit can either be predefined or can be dynamically decided based on the replacement policy and the performance expected from the proposed hardware hash table. Movement limit is configured to define the number of times repositioning of an evicted key is to be performed prior to discarding the evicted key. In an example implementation, each time a key value is evicted after being replaced by another key value, the movement count can be incremented such that when that newly evicted key value is attempted for repositioning, the count can be checked for whether it is equal to the desired movement limit configured by the system. At 1110, if the movement limit has reached, the key is fully discarded from the table. On the other hand, at 1107, if the movement limit has not been reached, an appropriate location for addition of the key is determined from the extracted locations based on one or more replacement policies. At 1108, the key is added in the determined location and the previously stored value in the determined location is evicted. At 1109, the newly evicted entry is set aside for re-insertion attempt into the table using cuckoo mechanism.

One example implementation of the combined associative and cuckoo way table is the cache coherency maintenance data structure called directory table for a directory based cache coherence controller. The directory table may be configured to track coherent address lines in the system. The table can be configured to store coherent cache line addresses and a vector of agents sharing the line at any time, and can further be configured to store coherence state of the cache line as to whether the line is unique, shared, dirty, invalid, etc. The directory table supports lookup operations to search addresses of coherent requests, to determine state and sharers of the address, and the need for any snoops to be sent to the sharing agents. The table can further support updates for addition of new cache line addresses and for updates to exiting cache lines during the addition or removal of sharers. Further, addition of new cache line addresses to the directory can result in eviction of exiting entries in the event of conflict misses.

In small systems, a 1:1 directory can be used to track lines. Such a directory holds entries for all blocks cached by agents in the system. This may be the most efficient in terms of storage and avoids having to snoop lines on an eviction (if a line is replaced by an agent, it will be naturally evicted). However when many agents exist, the number of directory entries that need to be looked up and compared against may increase quickly. In larger systems, a global directory is more practical where all agents share a single large directory structure with limited associativity.

To avoid unnecessary conflict misses, the table disclosed in the present disclosure can be employed. Different ways of the directory can use different indexing methods. While conflicts can still exist, it is possible to move a line to a different location within the directory where there may not be a conflict.

Figure 12:
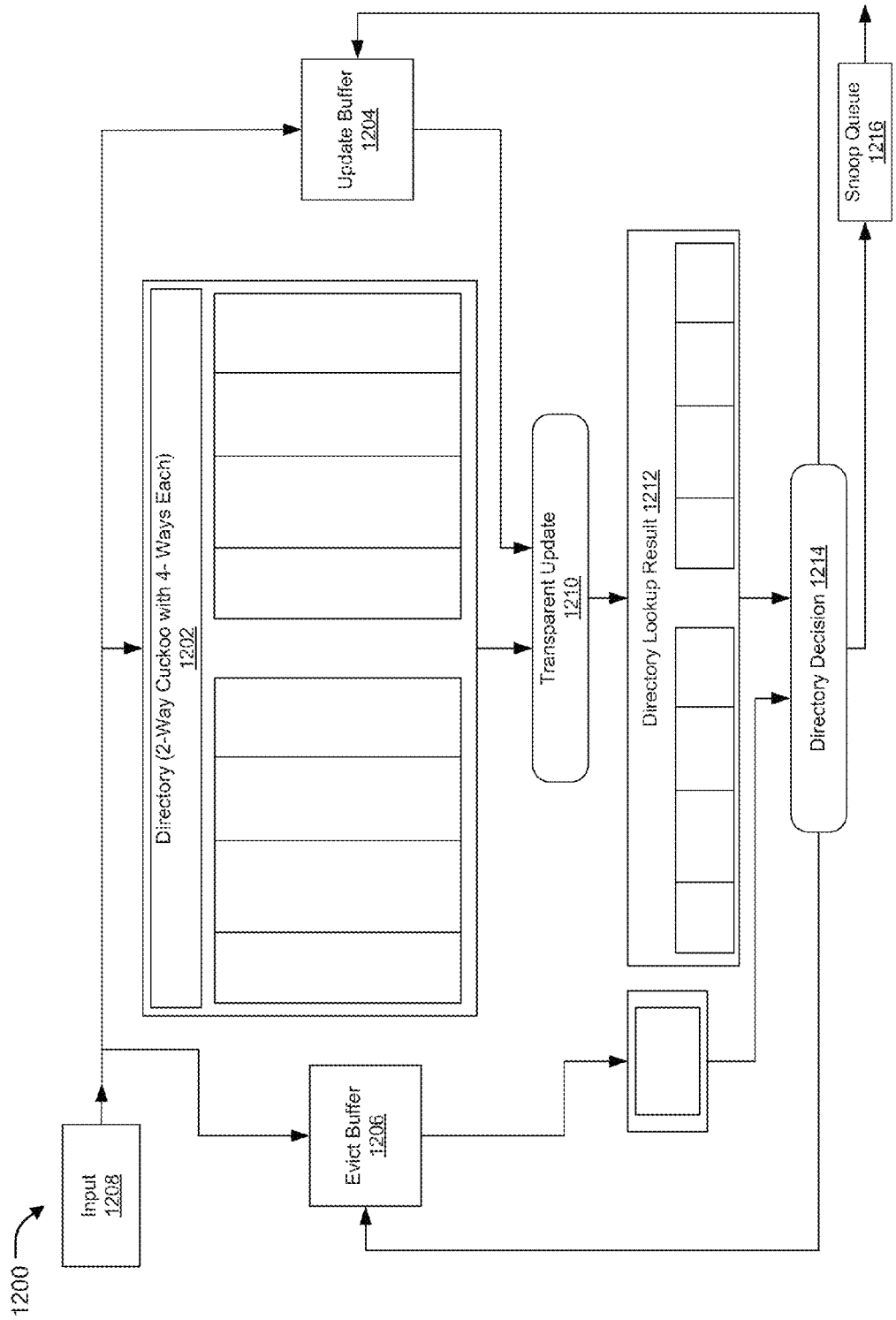
FIG. 12 illustrates example structure of directory control.

FIG. 12 illustrates structure 1200 of directory control in accordance with an implementation of the present disclosure. The structure 1200 comprises a directory 1202 configured in an example form of a 2 way cuckoo with 4 ways each. The structure 1200 can further comprise an update buffer 1204, which tracks updates that need to be written to the directory 1202 but have not had an opportunity to perform the write yet. Structure 1200 further comprises an evict buffer 1206 for lines that are replaced in the directory 1202 with a new request. In one example implementation, these replacements are generated because of capacity or associativity limits.

FIG. 12 further illustrates shows how the directory 1202, the update buffer 1204, and the evict buffer 1206 interact with one another. In an example implementation, FIG. 12 illustrates an input 1208 to the directory 1202, wherein the input may be a coherent lookup. The lookup can be configured to check the contents of the directory 1202, the update buffer 1204, and the evict buffer 1206, which would together indicate if the line is present in one of the caches.

In an example implementation, the update buffer 1204 and the directory 1202 can be tightly coupled. When a lookup occurs, the update buffer 1204, also referred to as update queue hereinafter 1204, modifies the output of the directory 1202 so that it appears as if it has already been updated. If an entry is marked for invalidation in the update queue 1204, the lookup of the directory will appear as if the entry has already been invalidated. If the entry is to be updated or overwritten, the output will appear as if the entry is updated. This is handled by the transparent update logic 1210 of FIG. 12, which creates a view of the directory 1202 based on the latest information. An example of such a view can be seen at 1212. The evict buffer 1206 looks like a second, parallel directory. If the coherent lookup 1208 matches in the directory 1202, it will count as a directory hit.

A directory decision control block 1214 can be configured to determine what operations are necessary based on the coherent lookup request 1208 and the directory lookup results 1212. If an update to the directory 1202 is needed, the update will be written into the update queue 1204. If a new entry must be written into the directory 1202, a decision will be made about which entry needs to be written. If that entry is already taken, an eviction will be required and the results will be moved to the evict buffer 1206. Note that this decision is based on the combined directory and update buffer result. The entry that is evicted may actually be still in the update queue 1204.

In an example implementation, when the new update to that entry is added to the update queue 1204, either the existing entry needs to be invalidated or the update queue 1204 needs to make sure it issues the updates in the order they were added to the queue 1204. Finally, if the coherent lookup 1208 requires a snoop to be sent to an agent, the snoop information can be sent out of the directory control logic/director decision 1214 to a snoop queue 1216.

It would be appreciated that one of the advantages of the cuckoo style of indexing is that two addresses that conflict in one associative set will usually map to different sets in the other way or ways, which means that if a new address cannot find a place in the directory, it is possible that one of the existing addresses in those ways can be moved to a new location that might be empty. If the directory is larger than the total number of entries it needs to track, there is a probability of hitting an empty line. For example, if the directory is 2 times its needed capacity, there will frequently be open spaces.

In one example implementation, when a line is evicted from the directory 1202, it will go into the evict buffer 1206. Instead of immediately sending a request to have the line invalidated, the evict buffer 1206 may attempt to perform a lookup of the directory 1202 with its eviction address, for which the buffer 1206 may have to perform this operation when no other directory lookup is happening and will have to compete with updates who also want to access the directory. On a successful lookup, the evict buffer 1206 may determine if an empty spot exists where the evicted entry can be written into. If the evicted line requires multiple directory entries, it will have to determine if enough empty spots exist. If there is room to move the entry, the evicted line may be moved, which, as a result, helps avoid unnecessary invalidations of lines that are in use.

In summary, since the proposed design is not a full directory and rather a global directory, conflict or capacity eviction can cause cache line addresses being tracked in the directory to be evicted. This will force invalidation of these lines from the caches of the sharing agents in the system. Such forced invalidation of coherent cache line addresses can be detrimental to the performance of the coherent system. Employing the combined cuckoo and set associative structure disclosed in the example implementations allows the directory table to reduce conflict miss evictions and hence forced invalidation of useful coherent cache lines from the system.

In one example implementation, if an evicted line in the evict buffer 1206 is unable to find an empty position in its cuckoo sets; it is possible that the evicted line from evict buffer could replace an existing entry from its cuckoo sets and that new evicted line can perform yet another lookup. Since the new evicted line will likely have a different indexing for one of the cuckoo indexes, the new evicted line may find a place to relocate to. These modifications may increase complexity, such that not only will these eviction entries need to change places, but the logic will need to remember how many repeats have been tried. The logic would also need to avoid replacing lines from earlier operations. To provide further simplification, a new request will have an opportunity to find an empty spot, and if an empty spot cannot be found, the replaced line will get one additional try. If the additional try is insufficient, the actual eviction will take place. It should be appreciated that this is only one exemplary implementation of handling evicted lines and any other alternative mechanism can also be implemented if desired.

In another example implementation, when a new entry needs to be written, a decision must be made about which existing entry should be replaced. The replacement decision can look for invalid entries first, which helps avoid evicting entries unnecessarily and avoid agents to lose cache lines and suffer performance. If there are multiple empty entries, tone may optionally pick the cuckoo way that has the most empty entries, which spreads out the use of line and reduces the potential for new request to find no empty position. If all entries are full, a decision can be made to reduce the cost of eviction. Within each cuckoo way, a pLRU scheme can be used to avoid the most recently used lines. The replacement policy could try to avoid replacing lines with significant (vector) sharing, as it may impact many more agents.

Another possible advantage of having associative ways within a cuckoo way compared to all cuckoo ways is that the associative ways may be merged or split dynamically to encode the sharers depending on the number of agents sharing a cache line address at a given time. For instance, when the number of sharers of a line is limited, four associative ways can track four different cache lines, whereas when the number of sharers for one of the lines exceeds the vector space available in a single associative way, it can merge two associative ways and use the additional space to encode the sharers in a larger vector. Furthermore, some portions of the detailed description are presented in terms of algorithms and symbolic representations of operations within a computer.

These algorithmic descriptions and symbolic representations are the means used by those skilled in the data processing arts to most effectively convey the essence of their innovations to others skilled in the art. An algorithm is a series of defined operations leading to a desired end state or result. In the example implementations, the operations carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A processor storing instructions for executing a process, the instructions comprising:
    managing a cache coherency maintenance data structure based on a hash table comprising a plurality of cuckoo ways;
    wherein each of the plurality of cuckoo ways is associated with at least one multi-set associative table;
    wherein each of the plurality of cuckoo ways is associated with a hash function, and wherein the managing the cache coherency maintenance data structure further comprises processing an address with the hash function of each of the plurality of cuckoo ways to generate an index for each of the plurality of cuckoo ways, the index for each of the plurality of cuckoo ways being indicative of a value corresponding to the address and the set for the address in the associated at least one multi-way set associative table of each of the plurality of cuckoo ways.

2. The processor of claim 1, wherein the managing the cache coherency maintenance data structure comprises building one or more directory tables corresponding to the cache coherency maintenance data structure in the hash table.

3. The processor of claim 1, wherein the associated at least one multi-way set associative table has different number of associative ways for each of the plurality of cuckoo ways.

4. The processor of claim 1, wherein the associated at least one multi-way set associative table has same number of associative ways for each of the plurality of cuckoo ways.

5. The processor of claim 1, wherein the managing the cache coherency maintenance data structure further comprises searching for the address in the associated at least one multi-way set associative table of each of the plurality of cuckoo ways based on the index.

6. The processor of claim 1, wherein the managing the cache coherency maintenance data structure further comprises adding the address in a location of the associated at least one multi-way set associative table of each of the plurality of cuckoo ways; the location selected from a set of locations corresponding to the index.

7. The processor of claim 6, wherein the managing the cache coherency maintenance data structure further comprises: upon evicting an address from one way of the at least one multi-way set associative table of one of the plurality of cuckoo ways, attempting a re-insertion of the evicted address in one way of the at least one multi-way set associative table of the one of the plurality of cuckoo ways.

8. A method, comprising:
    managing a cache coherency maintenance data structure based on a hash table comprising a plurality of cuckoo ways;
    wherein each of the plurality of cuckoo ways is associated with at least one multi-way set associative table;
    wherein each of the plurality of cuckoo ways is associated with a hash function, and wherein the managing the cache coherency maintenance data structure further comprises processing an address with the hash function of each of the plurality of cuckoo ways to generate an index for each of the plurality of cuckoo ways, the index for each of the plurality of cuckoo ways being indicative of a value corresponding to the address and the set for the address in the associated at least one multi-way set associative table of each of the plurality of cuckoo ways.

9. The method of claim 8, wherein the managing the cache coherency maintenance data structure comprises building one or more directory tables corresponding to the cache coherency maintenance data structure in the hash table.

10. The method of claim 8, wherein the associated at least one multi-way set associative table has different number of associative ways for each of the plurality of cuckoo ways.

11. The method of claim 8, wherein the associated at least one multi-way set associative table has same number of associative ways for each of the plurality of cuckoo ways.

12. The method of claim 8, wherein the managing the cache coherency maintenance data structure further comprises searching for the address in the associated at least one multi-way set associative table of each of the plurality of cuckoo ways based on the index.

13. The method of claim 8, wherein the managing the cache coherency maintenance data structure further comprises adding the address in a location of the associated at least one multi-way set associative table of each of the plurality of cuckoo ways; the location selected from a set of locations corresponding to the index.

14. The method of claim 13, wherein the managing the cache coherency maintenance data structure further comprises: upon evicting an address from one way of the at least one multi-way set associative table of one of the plurality of cuckoo ways, attempting a re-insertion of the evicted address in one way of the at least one multi-way set associative table of the one of the plurality of cuckoo ways.

15. A processor storing instructions for executing a process, the instructions comprising:
    managing a cache coherency maintenance data structure by building one or more directory tables corresponding to the cache coherency maintenance data structure from cuckoo hashing;
    wherein the managing the cache coherency maintenance data structure further comprises:
        utilizing an temporary eviction buffer for holding addresses evicted from the one or more directory tables upon eviction of an address from the one or more directory tables; and
        processing cache requests by utilizing the one or more directory tables and the temporary eviction buffer.

16. The processor of claim 15, wherein the building one or more directory tables is also based on set associative tables.

17. The processor of claim 15, wherein the managing the cache coherency maintenance data structure further comprises attempting to relocate evicted addresses from the temporary eviction buffer back to the one or more directory tables based on a policy.

18. The processor of claim 15, wherein the managing the cache coherency maintenance data structure further comprises selecting addresses to evict based on a policy.

* * * * *